US006889810B2

(12) United States Patent
Müller

(10) Patent No.: US 6,889,810 B2
(45) Date of Patent: May 10, 2005

(54) CLUTCH SEGMENT

(76) Inventor: Werner Müller, Ehekirchener Strasse 16, 86669 Königsmoos (DE)

( * ) Notice: Subject to any disclaimer, the term of this patent is extended or adjusted under 35 U.S.C. 154(b) by 0 days.

(21) Appl. No.: 10/440,059

(22) Filed: May 16, 2003

(65) Prior Publication Data

US 2004/0040819 A1 Mar. 4, 2004

(30) Foreign Application Priority Data

May 17, 2002  (DE) .......................................... 202 07 795

(51) Int. Cl.[7] ................................................. F16D 7/06
(52) U.S. Cl. ..................... 192/70.23; 192/93 A; 192/96
(58) Field of Search .......................... 192/70.23, 70.24, 192/70.27, 89.21, 89.24, 93 A, 96, 101

(56) References Cited

U.S. PATENT DOCUMENTS

| | | | | |
|---|---|---|---|---|
| 1,189,355 A | * | 7/1916 | Ellett ....................... | 192/217.6 |
| 1,207,542 A | * | 12/1916 | Gustafson ................... | 192/63 |
| 2,852,116 A | * | 9/1958 | Spase ....................... | 192/89.22 |
| 2,931,476 A | * | 4/1960 | Zeidler et al. ............ | 192/89.21 |
| 3,498,432 A | * | 3/1970 | Seibt ........................ | 192/70.23 |
| 3,791,501 A | * | 2/1974 | Culbertson ................ | 192/93 A |
| 3,848,717 A | * | 11/1974 | Culbertson ................ | 192/93 A |
| 6,328,147 B1 | * | 12/2001 | Fujita ....................... | 192/70.23 |

* cited by examiner

*Primary Examiner*—Saul Rodriguez
(74) *Attorney, Agent, or Firm*—Westman, Champlin & Kelly, P.A.

(57) ABSTRACT

A device for coupling and decoupling two shafts or other elements of a drive train for transmitting rotations or torques especially to be used as a clutch segment in the field of motorcycle drives is provided. The clutch segment includes two parts one of which comprise troughs or recesses being arranged on a circle and offset by essentially the same angle. The troughs are at least approximately tangentially abutting an inner circle. The troughs linearly extend from their deepest point, beginning with a radius of the inner circle, at an angle towards an edge thereof and turn over towards the edge of a radius. A force application point for applying a force for coupling or decoupling the elements is located at a distance from a rotation axis of the clutch segment.

19 Claims, 3 Drawing Sheets

CLUTCH SEGMENT

The present application claims the priority under 35 U.S.C. § 119 of German patent application Serial No. 202 07 795.0, filed May 17, 2002, the content of which is hereby incorporated by reference in its entirety.

FIELD OF THE INVENTION

The invention discloses a device for coupling and decoupling two shafts or other elements of a drive train for transmitting rotations or torques especially to be used as a clutch segment in the field of motorcycle drives.

BACKGROUND OF THE INVENTION

Coupling and decoupling shafts for transmitting rotations or torques for drives of two wheelers or motorcycles in systems that are common today is usually achieved by a clutch segment that will be shortly described below. Such a common and usual clutch segment (also listed as "inner and outer ramp" in Harley Davidson parts lists) is shown in FIGS. 6a, 6b.

The clutch segment consists of two segment parts (inner and outer ramp) 14, 15 that show a mainly circular shaped and flat design. Further, the two parts show troughs and pockets, respectively, or recesses 16, that have a circle-segment formed opening and are located on a circle 17, having a center M, in a manner to position the point of intersection of the secant, that marks the boundary of the circle-segments of the opening, and the symmetrical plane of the respective trough 16, on the circle 17 and that the troughs 16 are offset in relation to each other by the same angle. The center M of the circle 17 correlates to the center of rotation of the clutch segments 14, 15. The circle 17 has a radius of 14 mm.

The troughs 16 linearly open out, starting with a radius R11=5 mm at their deepest point with an angle of $\alpha_b$=16.77° or 23.9° towards the surface of the clutch segment parts 14, 15. A common clutch segment part 14, 15 has three of the described troughs.

Part 15 of the common clutch segment has a lever 19 that is equipped with a connection point 18 for applying a force to connect or disconnect the drive elements (not shown). This connecting point is located at a range $l_b$=40 mm from the center M of the circle 17, around which the troughs 16 are located, and thus distanced from the center M of the clutch segment element 15 as well as from the turning axis of the clutch segment and the drive elements.

Further, element 15 of the clutch segment which is equipped with the lever 19 has a flattening 20 along the circular perimeter.

The second element 14 of the clutch segment has a journal like extension 21 at the perimeter.

Such clutch segments are common and well known in the state of the art and are primarily used with Harley Davidson motorcycles (named inner ramp 6b and outer ramp 6a).

The discussed clutch segments have a significant disadvantage in that a high amount of force is required to actuate those systems. Since the clutch lever is actuated with the left hand it is very demanding and difficult for weaker motorcyclists and especially for women to operate the clutch safely and in a correct manner.

SUMMARY OF THE INVENTION

It is thus an object of the present invention to provide a device enabling the operation of a clutch system with a significant less amount of force. It is a further object of the present invention to provide a device according to the above mentioned object that is enabled to be installed in an existing clutch/transmission housing.

Those objects are achieved by the features of the claims.

The invention is based on the gist that, by lengthening the lever for applying the force to operate the clutch segment (actuation force) and by shortening the lever for the application point of the clutch force, a change of the ratio actuation force (that is to be applied for shifting gears)/clutch force (that is required for a gear shift operation) is reached in a way that less force (actuation force) is required to effect the requisite clutch force for shifting gears.

The necessary lengthening of the length of the actuation path that is required to carry out a gear shift operation according to the above discussed change is however not practicable since, due to the limited space available in the clutch/transmission housing and due to the geometrical limitations of the clutch lever and the anatomical limitations of an average built operator, respectively, a lengthening of the actuation path/travel is not possible.

Therefore the present invention is further based on the gist that the required actuation travel for operating the clutch can be reached by a change of geometry of the troughs/recesses, by a variable course of the clutch force that has to be overcome, and by the fact that an additional tuning of the geometry of the troughs as well as the levers enables an optimizing of the force required to operate the clutch.

BRIEF DESCRIPTION OF THE DRAWINGS

In the following, the invention will be described with reference to a preferred embodiment and to the drawings, in which:

FIGS. 1a, 2a are top views of a clutch segment according to the present invention, wherein FIG. 1a is a fixed or static segment part.

FIGS. 2a, 2b show details of a clutch segment according to the present invention, wherein FIG. 2a is a cross-sectional view of a trough/recess according to the present invention, and FIG. 2b is a further detail of a trough/recess according to the present invention;

FIGS. 3a, 3b, 3c show a preferred embodiment of a clutch segment according to the present invention, wherein FIG. 3a is a side view of a clutch segment with a lever for applying the force for coupling and decoupling the elements of a drive train, FIG. 3b is a top view of the element shown in FIG. 3a, and FIG. 3c is a clutch segment part according to FIGS. 3a and 3b for static/fixed installation in the clutch/transmission housing;

FIGS. 4a, 4b, 4c show a further preferred embodiment of a clutch segment according to the present invention, wherein FIG. 4a is a side view of a clutch segment having a lever for applying the force for coupling and decoupling the elements of a drive train, FIG. 4b is a top view of the element shown in FIG. 4a, and FIG. 4c is a clutch segment part according to FIGS. 4a and 4b for static/fixed installation in the clutch/transmission housing;

FIGS. 5a, 5b, 5c show a further preferred embodiment of a clutch segment according to the present invention, wherein FIG. 5a is a side view of a clutch segment having a lever for applying the force for coupling and decoupling the elements of a drive train, FIG. 5b is a top view of the element shown FIG. 5a, and FIG. 5c is a clutch segment part according to FIGS. 5a and 5b for static/fixed installation in the clutch/transmission housing; and FIGS. 6a, 6b show a PRIOR ART common clutch segment, wherein FIG. 6a is a clutch segment for static/fixed installation in the clutch/transmission housing, and FIG. 6b is a known common clutch segment with a lever for applying the force for coupling and decoupling the elements of a drive train.

DETAILED DESCRIPTION OF THE PREFERRED EMBODIMENTS

Figure 1A:
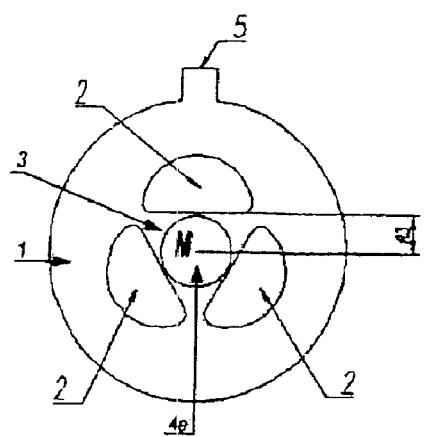
Figure 1B:
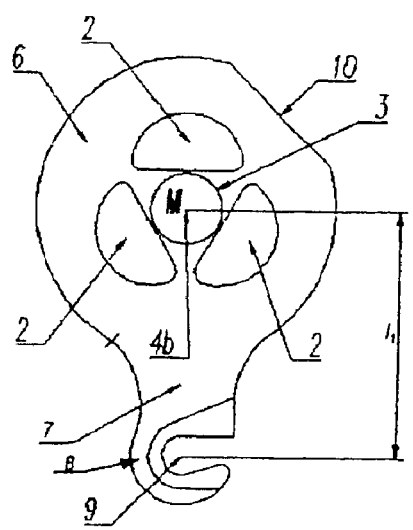
FIG. 1b is a flexible or movable segment part with a lever for applying the force for coupling or decoupling the elements of a drive train.

FIGS. 1a, 1b show two corresponding clutch segment parts 1, 6 according to the present invention. FIG. 1a shows a clutch segment part 1 comprising three troughs/recesses 2 which are positioned on a circle, offset in relation to each other by the same angle, such that the troughs 2 tangentially abut or at least approximately tangentially abut an inner circle and are rotationally symmetrical aligned around the center M of the inner circle 3. The troughs 2 have a circle-segment shaped opening at the upper surface of the clutch segment 1, the straight side or secant of the circular segments touching the inner circle 3 with their mid-point, at least approximately tangentially. Clutch segment 1 further comprises a connecting device 4a. The connecting device 4a is preferably designed as an opening or passage which is preferably circular shaped and concentric with the inner circle 3. The connecting device 4a comprises additional elements to connect parts of the drive train, mainly gear elements, in a preferred embodiment. In a preferred embodiment the radius of the inner circle 3 and the radius of the opening of the device 4 are more or less identical. The radius R3 of the inner circle 3 is, according to the present invention, about 6 mm to 8 mm, preferably about 6.7 mm.

The clutch segment part 1 is preferably substantially circular shaped and comprises a land or a journal like extension 5. Extension 5 is preferably used for a static/fixed installation of clutch segment 1 in the clutch/transmission housing (not shown).

FIG. 1b shows a clutch segment part 6 according to the present invention, that comprises troughs 2, an inner circle 3 and a connecting device 4b, the troughs 2 and the inner circle 3 corresponding to those described with regard to the clutch segment part 1 of FIG. 1a.

Further, clutch segment part 6 comprises an extension or lever 7 for applying the force for coupling and decoupling the elements of a drive train wherein the lever comprises element 8 for taking up the applied force. In a preferred embodiment this element 8 or the lever 7 are designed as a hook. The distance $L_1$ between the application point of the force 9 on the element 8 and the lever 7, respectively, and the center of the inner circle 3 and the connecting feature 4b, respectively, is in the range from about 42 mm to 46 mm, and is preferably about 44 mm.

Furthermore, the clutch segment part 6 has a preferably circular shaped design with a flattening 10.

Figure 2A:
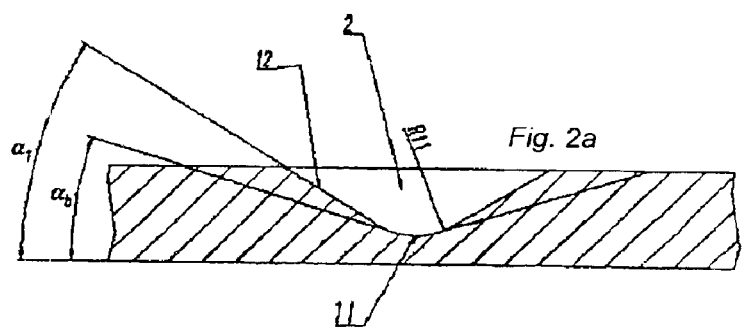
Figure 2B:
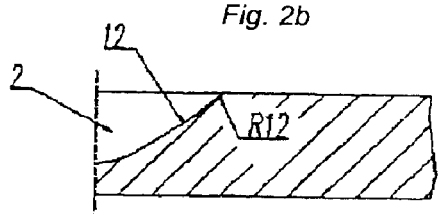

FIGS. 2a, 2b show a detail of troughs 2 according to the present invention. FIG. 2a shows a sectional view of a preferred trough 2. The trough 2 has a radius R11 of 5 mm at its deepest point 11 which turns over to a surface 12 inclined at an angle $\alpha_1$, that extends to the upper edge of the trough 2. The straight linear side wall 12 turns over towards the edge of the trough 2 to a progressively increasing radius R12, as shown in FIG. 2b.

The angle $\alpha_1$, is, according to the present invention, in the range of about 26° to 33°, in a preferred embodiment about 28° and 31°. The radius R12 is in the range of about 38° to 42°, and preferably about 40°.

As a comparison, FIG. 2a shows an angle ab at which the side wall 12 of the trough 2 extends to the edge of the trough 2 in the state of the art. The angle ab has a value of 16.77° and 17°, respectively, and, in a further common embodiment, 23.90°.

FIGS. 3a, 3b, 3c, 4a, 4b, 4c, 5a, 5b and 5c show special embodiments of the clutch segment according to the present invention, wherein the measurements and the geometry of the troughs 2, inner circles 3, connecting devices 4a, 4b and force application points 9 corresponds to embodiments discussed with regard to in FIGS. 1a and 1b.

Figure 3A:
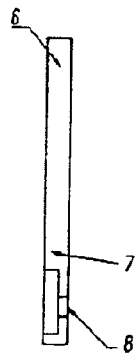
Figure 3B:
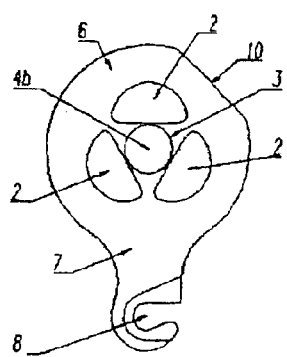
Figure 3C:
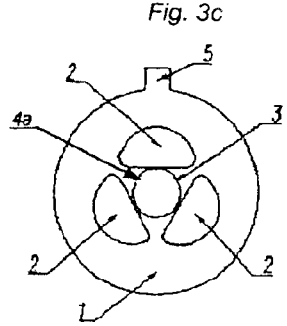

FIGS. 3a, 3b, 3c show a preferred embodiment according to the present invention in which the clutch segment part 6 (FIGS. 3a and 3b) has a substantially rectangular shape in a side view. FIG. 3c shows a clutch segment part 1 according to the one discussed and shown in FIG. 1a.

Figure 4A:
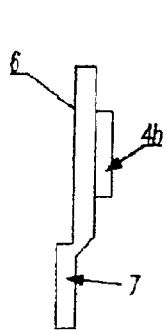
Figure 4B:
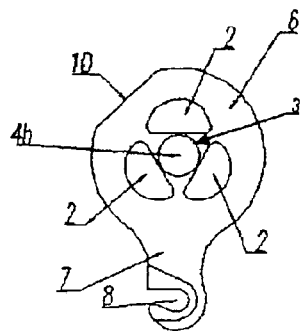
Figure 4C:
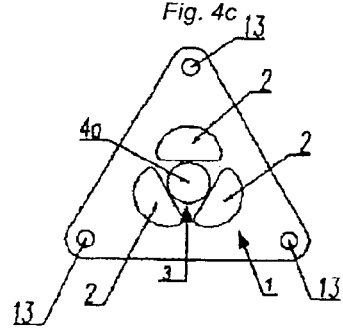

FIGS. 4a, 4b, 4c show a preferred embodiment of a clutch segment according to the present invention, wherein the lever 7 of the clutch segment part shown in FIGS. 4a and 4b is bent and (at right angles) and wherein the connecting device 4b is extended in the opposite direction of the bending direction of the lever 7. The clutch segment part 1 shown in FIG. 4c further has a triangle shaped design with attachment means 13 located at the edges. The attachment means 13 can be designed as, e.g., a hole, groove or pin.

Figure 5A:
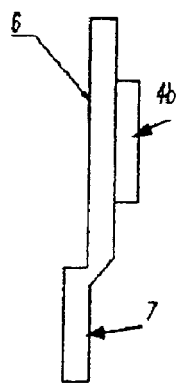
Figure 5B:
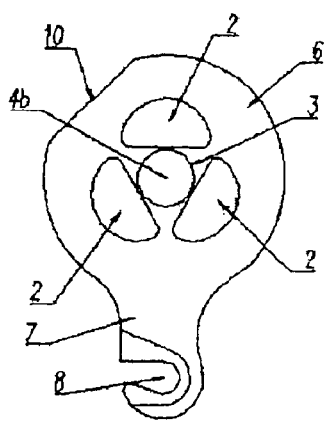
Figure 5C:
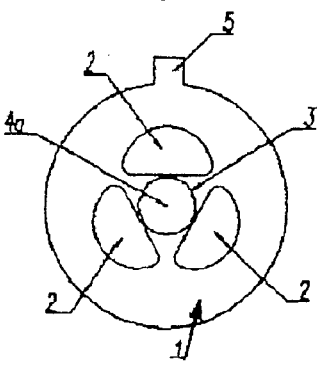

FIGS. 5a, 5b, 5c show clutch segment parts 1 (FIG. 5c) and 6 (FIGS. 5a and 5b) according to the present invention, the clutch segment 6 shown in FIGS. 5a and 5b corresponding to the clutch segment 6 shown in FIGS. 4a and 4b and the clutch segment 1 shown in FIG. 5c corresponding to the clutch segment 1 shown in FIG. 3c.

Figure 6A:
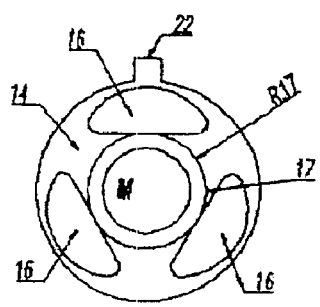
Figure 6B:
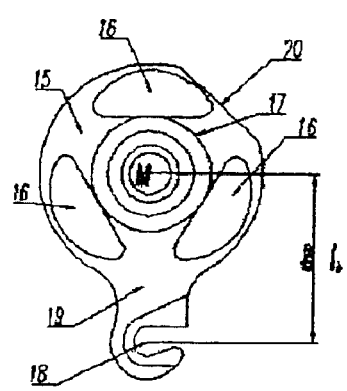

FIGS. 6a, 6b show a PRIOR ART common design of the clutch segment part 6 (FIG. 6b) and the clutch segment part 1 (FIG. 6a) as already mentioned in the discussion of the state of the art. The known clutch segments 14 and 15 according to the state of the art show troughs 16 which have a geometrical design already discussed with regard to FIGS. 2a, 2b, that means $\alpha_b$=17°. The troughs 16 are located around a circle 17 having a radius R17 of 14 mm in a manner similar to the troughs 2 according to the present invention. The force application point 18 of the lever 19 of the clutch segment 15 is dislocated at a range $L_b$ of the center of the circle 17, wherein the length Lb has a value of 40 mm.

The clutch segment according to the present invention is especially suited for the use in motorcycle clutches and particularly for Harley Davidson motorcycles.

The embodiment of the clutch segment parts 1 and 6 as shown in FIGS. 3a, 3b, 3c are especially suited for use in the Harley Davidson models EVO and Big Twin (abbrev. FXR, FXD, FXST, FLST, FLH) starting from production year 1987, depending on the individual design of the clutch segment. The preferred embodiments of the clutch segment parts 1 and 6 as shown in FIGS. 4a, 4b, 4c are especially suited for the use in XLH models year 1984 to 1992 and up. The preferred embodiments of the clutch segment parts 1 and 6 as shown in FIGS. 5a, 5b, 5c are especially suited for use in XLH models year 1993 and up. Further, the clutch segments according to the present invention are suited for use in all Harley Davidson Sportster models year 1984 and up.

Due to the special arrangement of the troughs 2 and the force application point 9 of the clutch segment and the special geometrical design of the recesses 2, a significant reduction of the required force for actuating the clutch is achieved without the necessity of prolonging the travel/path of the clutch lever or an enlargement of the clutch/transmission housing. This leads to an increased comfort level for driving and to a significant increase in safety by a relaxed driving, requiring less effort.

What is claimed is:

1. A pair of clutch segment parts for application of torques, in drives, the clutch segment parts each comprising troughs arranged abutting inner circles and, characterized in that:

the inner circles have a radius R3 between 6 mm and 8 mm, and the troughs extend from their deepest point, beginning with a radius R11 of 5 mm out to an angle α1 of 26° to 33° and extending from the angle α1 outwardly with a radius R12 of 36 mm to 42 mm towards an edge of the trough; and a force application point for applying a force for controlling the application of torque is located at a distance L, of 42 mm to 46 mm from a rotation axis M of the clutch segment parts.

2. The pair of clutch segment parts according to claim 1, wherein the inner circles have a preferred radius R3 of 6.7 mm.

3. The pair of clutch segment parts according to claim 1, wherein the troughs linearly extend towards the edge at an angle α1 of 28° to 31°.

4. The pair of clutch segment parts according to claim 1, wherein the troughs turn over towards the edge with a radius R12 of preferably 40 mm.

5. The pair of clutch segment parts according to claim 1, wherein the radius R12 progressively increases towards the edge of the troughs up to a value of 40 mm.

6. The pair of clutch segment parts according to claim 1, wherein the force application point is located at a range $L_1$ of 44 mm away from the rotation axis M of the clutch segment part.

7. The pair of clutch segment parts according to claim 1, wherein the troughs have a circle-segment shaped opening and face toward surfaces of the clutch segment parts.

8. The pair of clutch segment parts according to claim 1, wherein the troughs are rotationally symmetrically arranged around the rotation axis M.

9. The pair of clutch segment parts according to claim 1, wherein the the inner circles are centered on the rotation axis M.

10. The pair of clutch segment parts according to claim 1, wherein the number of troughs on each clutch segment part is three.

11. The pair of clutch segment parts according to claim 1, wherein the clutch segment parts each comprise a connecting device.

12. The pair of clutch segment parts according to claim 11, wherein each connecting device is arranged concentric with the rotation axis M.

13. The pair of clutch segment parts according to claim 1, wherein the clutch segment parts are substantially circular shaped.

14. The pair of clutch segment parts according to claim 1, wherein the clutch segment parts are shaped as a segment of a circle.

15. The pair of clutch segment parts according to claim 1, wherein one of the clutch segment parts comprises an extension that includes the force application point.

16. The pair of clutch segment parts according to claim 15, wherein the lever comprises a hook shaped section.

17. The pair of clutch segment parts according to claim 1, wherein the lever is bent at right angles.

18. The pair of clutch segment parts according to claim 1, wherein at least one of the clutch segment parts has a substantially triangular shape.

19. The pair of clutch segment parts according to claim 1, wherein the drive is a motorcycle drive.

* * * * *